US008947598B2

(12) United States Patent
Lee

(10) Patent No.: US 8,947,598 B2
(45) Date of Patent: Feb. 3, 2015

(54) METHOD FOR DISPLAYING WALLPAPER ON DIGITAL BROADCASTING RECEPTION TERMINAL

(75) Inventor: Gun-Su Lee, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 1295 days.

(21) Appl. No.: 11/491,681

(22) Filed: Jul. 24, 2006

(65) Prior Publication Data

US 2007/0109445 A1 May 17, 2007

(30) Foreign Application Priority Data

Nov. 11, 2005 (KR) ........................ 10-2005-0107935

(51) Int. Cl.

| | |
|---|---|
| ***H04N 5/445*** | (2011.01) |
| ***H04N 5/44*** | (2011.01) |
| ***G06F 3/048*** | (2013.01) |
| ***H04H 20/42*** | (2008.01) |

(52) U.S. Cl.

CPC .................................... *H04H 20/42* (2013.01)
USPC ............................ 348/553; 348/563; 715/867

(58) Field of Classification Search

USPC ................. 348/553, 559, 563–565, 705–706; 715/867
See application file for complete search history.

(56) References Cited

U.S. PATENT DOCUMENTS

| | | | | | |
|---|---|---|---|---|---|
| 5,287,109 | A | * | 2/1994 | Hesse | 341/176 |
| 5,481,296 | A | * | 1/1996 | Cragun et al. | 725/136 |
| 5,643,084 | A | * | 7/1997 | Mirsky | 463/9 |
| 5,699,104 | A | * | 12/1997 | Yoshinobu | 725/27 |
| 5,703,655 | A | * | 12/1997 | Corey et al. | 348/468 |
| 5,796,945 | A | * | 8/1998 | Tarabella | 709/219 |
| 5,815,145 | A | * | 9/1998 | Matthews, III | 725/41 |
| 5,819,284 | A | * | 10/1998 | Farber et al. | 709/203 |
| 5,884,056 | A | * | 3/1999 | Steele | 715/738 |
| 5,959,687 | A | * | 9/1999 | Dinwiddie et al. | 348/564 |
| 5,987,150 | A | * | 11/1999 | Coppinger | 382/100 |
| 5,990,972 | A | * | 11/1999 | Bond-Harris et al. | 348/563 |
| 6,052,155 | A | * | 4/2000 | Cherrick et al. | 348/565 |
| 6,069,662 | A | * | 5/2000 | Horiuchi et al. | 348/446 |
| RE36,801 | E | * | 8/2000 | Logan et al. | 348/571 |
| 6,112,007 | A | * | 8/2000 | Kram | 386/46 |
| 6,172,712 | B1 | * | 1/2001 | Beard | 348/552 |
| 6,184,877 | B1 | * | 2/2001 | Dodson et al. | 725/110 |
| 6,204,842 | B1 | | 3/2001 | Fujii | |

(Continued)

FOREIGN PATENT DOCUMENTS

| | | |
|---|---|---|
| CN | 85104159 | 8/1986 |
| EP | 1 372 333 | 12/2003 |

(Continued)

*Primary Examiner* — Brian Yenke
(74) *Attorney, Agent, or Firm* — The Farrell Law Firm, P.C.

(57) ABSTRACT

Provided is a method for displaying a wallpaper that includes setting a broadcast picture display function to display a specific broadcast picture as a wallpaper in response to a user's request; changing a standby mode to a digital broadcasting reception mode at preset time intervals to periodically capture a picture from a digital broadcast delivered on a specific channel if the broadcast picture display function is set; and displaying the captured picture as a wallpaper for the digital broadcasting reception terminal. The digital broadcasting reception terminal can periodically capture a picture from a digital broadcast program currently delivered and display the captured picture as a wallpaper even when the user does not view the digital broadcast program.

16 Claims, 5 Drawing Sheets

(56) References Cited

U.S. PATENT DOCUMENTS

| | | | | |
|---|---|---|---|---|
| 6,215,523 | B1 * | 4/2001 | Anderson | 348/333.05 |
| 6,216,141 | B1 * | 4/2001 | Straub et al. | 715/234 |
| 6,233,389 | B1 * | 5/2001 | Barton et al. | 386/46 |
| 6,295,646 | B1 * | 9/2001 | Goldschmidt Iki et al. | 725/41 |
| 6,320,623 | B1 * | 11/2001 | Cavallerano et al. | 348/553 |
| 6,339,429 | B1 * | 1/2002 | Schug | 345/589 |
| 6,477,312 | B1 * | 11/2002 | Houston | 386/46 |
| 6,486,900 | B1 * | 11/2002 | Shen et al. | 715/867 |
| 6,536,041 | B1 * | 3/2003 | Knudson et al. | 725/39 |
| 6,665,017 | B1 * | 12/2003 | Raiyat | 348/468 |
| 6,870,573 | B2 * | 3/2005 | Yeo et al. | 348/569 |
| 6,924,845 | B1 * | 8/2005 | Wahlroos | 348/553 |
| 7,124,365 | B2 * | 10/2006 | Cavallerano et al. | 715/716 |
| 7,239,310 | B2 * | 7/2007 | Iinuma | 345/211 |
| 7,245,316 | B2 * | 7/2007 | Grimes et al. | 348/173 |
| 7,324,161 | B2 * | 1/2008 | Hwang | 348/569 |
| 7,383,563 | B1 * | 6/2008 | Rashkovskiy | 725/58 |
| 7,487,460 | B2 * | 2/2009 | Benson et al. | 715/767 |
| 7,502,545 | B2 * | 3/2009 | Affaki | 386/46 |
| 7,545,439 | B2 * | 6/2009 | Wahlroos | 348/553 |
| 7,694,320 | B1 * | 4/2010 | Yeo et al. | 725/41 |
| 7,757,252 | B1 * | 7/2010 | Agasse | 725/41 |
| 7,757,253 | B2 * | 7/2010 | Rappaport et al. | 725/41 |
| 7,765,574 | B1 * | 7/2010 | Maybury et al. | 725/105 |
| 7,814,421 | B2 * | 10/2010 | Reynolds et al. | 715/716 |
| 7,954,056 | B2 * | 5/2011 | Graham | 715/716 |
| 7,986,372 | B2 * | 7/2011 | Ma et al. | 348/700 |
| 2002/0104082 | A1 * | 8/2002 | Fries | 725/32 |
| 2002/0113828 | A1 * | 8/2002 | Kawakita | 345/867 |
| 2002/0171770 | A1 * | 11/2002 | Wendt et al. | 348/634 |
| 2003/0038893 | A1 | 2/2003 | Rajamaki et al. | |
| 2003/0214527 | A1 * | 11/2003 | Paul | 345/719 |
| 2004/0003399 | A1 * | 1/2004 | Cooper | 725/38 |
| 2004/0032393 | A1 * | 2/2004 | Brandenberg et al. | 345/156 |
| 2004/0049533 | A1 * | 3/2004 | Knight | 709/203 |
| 2004/0160532 | A1 * | 8/2004 | Sun | 348/559 |
| 2004/0243682 | A1 * | 12/2004 | Markki et al. | 709/207 |
| 2005/0030427 | A1 * | 2/2005 | Yamada | 348/559 |
| 2005/0111549 | A1 * | 5/2005 | Kim et al. | 375/240.12 |
| 2005/0114800 | A1 * | 5/2005 | Rao | 715/867 |
| 2005/0270422 | A1 * | 12/2005 | Hsieh | 348/553 |
| 2005/0278774 | A1 * | 12/2005 | Eshleman et al. | 725/153 |
| 2006/0045189 | A1 * | 3/2006 | Kim | 375/240.26 |
| 2007/0046830 | A1 * | 3/2007 | Chen et al. | 348/715 |
| 2007/0052853 | A1 * | 3/2007 | Yeh et al. | 348/559 |
| 2009/0217212 | A1 * | 8/2009 | Madar et al. | 715/867 |

FOREIGN PATENT DOCUMENTS

| | | |
|---|---|---|
| KR | 1020040025137 | 3/2004 |
| KR | 1020040072145 | 8/2004 |
| WO | WO 00/36836 | 6/2000 |
| WO | WO 03/038637 | 5/2003 |

* cited by examiner

METHOD FOR DISPLAYING WALLPAPER ON DIGITAL BROADCASTING RECEPTION TERMINAL

PRIORITY

This application claims priority to an application entitled "Method for Displaying Wallpaper on Digital Broadcasting Reception Terminal" filed with the Korean Intellectual Property Office on Nov. 11, 2005 and assigned Serial No. 2005-107935, the contents of which are incorporated herein by reference.

BACKGROUND OF THE INVENTION

1. Field of the Invention

The present invention relates generally to a digital broadcasting reception terminal, and in particular to a method for displaying a wallpaper on a digital broadcasting reception terminal.

2. Description of the Related Art

Digital broadcasting generally refers to high-quality, high-definition audio/video broadcasting services replacing conventional analog services. Digital broadcasting is broadly divided into digital satellite broadcasting and digital terrestrial broadcasting.

Digital satellite broadcasting offers multi-channel multimedia mobile broadcasting services through a handheld digital TV receiver (e.g. a mobile phone or a personal information terminal) or an in-car digital TV receiver, without the limitations of time and space.

Digital terrestrial broadcasting developed from Digital Audio Broadcasting (DAB) i.e., a digital radio system is a new concept in mobile-reception multimedia broadcasting services using an unused VHF Channel 12. Digital terrestrial broadcasting transmits television, radio and data broadcasts over multiple channels.

Rapid development of digital broadcasting technologies and mobile communication technologies has led to an increasing interest in digital broadcasting services enabling people to view digital broadcasts even while moving. Particularly, digital multimedia broadcasting (DMB) services offered through mobile communication terminals are attracting keen interest.

Recent digital broadcasting reception terminals have a function for capturing a picture during the output of a digital broadcast. Users can capture a desired picture while viewing a digital broadcast and store the captured picture. It is also possible to set or display the captured picture as a wallpaper (i.e., a background image) for a digital broadcasting reception terminal.

However, users have to press a capture key provided on the terminal in order to capture a desire picture while viewing a digital broadcast. Also, users have to press keys, such as a menu key, in order to set the captured picture as a wallpaper for the terminal.

Although a picture captured during a digital broadcast can be set as a terminal wallpaper, it is nothing but a wallpaper image satisfying the user's demand for distinctiveness and expression of individuality, without delivering any further information.

SUMMARY OF THE INVENTION

Accordingly, the present invention has been made to solve the above-mentioned problems occurring in the prior art, and an object of the present invention is to provide a method for periodically capturing a picture from a digital broadcast currently being delivered and displaying the captured picture as a wallpaper for a digital broadcasting reception terminal even when a user does not view the digital broadcast program.

Another object of the present invention is to provide a method for displaying a wallpaper on a currently delivered digital broadcasting reception terminal to enable a user to easily obtain information on a digital broadcast.

Still another object of the present invention is to provide a method for offering information on a digital broadcast currently delivered by displaying a wallpaper on a digital broadcasting reception terminal.

In order to accomplish the above objects of the present invention, there is provided a method for displaying a wallpaper on a digital broadcasting reception terminal. The method includes setting a broadcast picture display function to display a specific broadcast picture as a wallpaper in response to a user's request; changing a standby mode to a digital broadcasting reception mode at preset time intervals to periodically capture a picture from a digital broadcast, delivered on a specific channel, if the broadcast picture display function is set; and displaying the captured picture as a wallpaper for the digital broadcasting reception terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
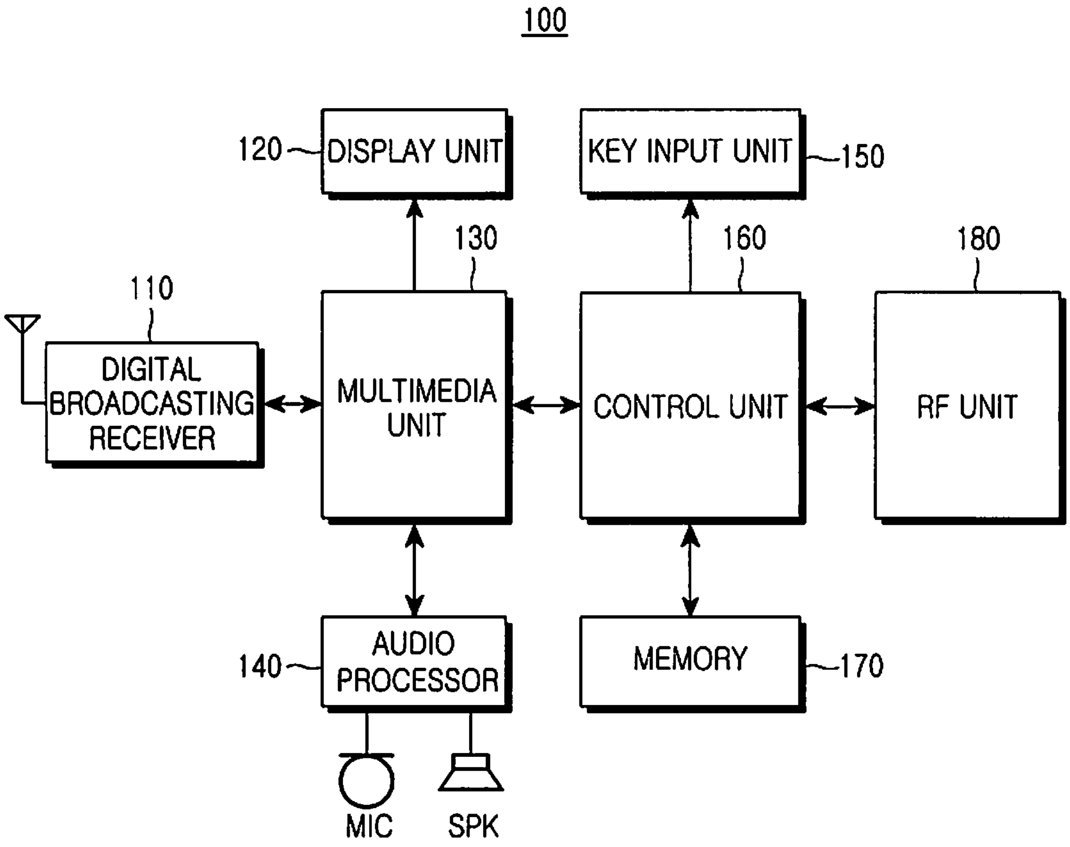
FIG. 1 is a block diagram of a digital broadcasting reception terminal according to the present invention.

FIG. 1 is a block diagram of a digital broadcasting reception terminal according to the present invention. The digital broadcasting reception terminal 100 includes a digital broadcasting receiver 110, a display unit 120, a multimedia unit 130, an audio processor 140, a key input unit 150, a control unit 160, a memory 170 and an RF unit 180.

The digital broadcasting receiver 110 receives and demodulates digital broadcast frames under the control of the control unit 160, and outputs the demodulated broadcast frames to the multimedia unit 130. Although not illustrated in FIG. 1, the digital broadcasting receiver 110 can includes a demodulator for demodulating the received digital broadcast frames into digital data streams. Also, the digital broadcasting receiver 110 receives Electronic Program Guide (EPG) data offering digital broadcast program information and transfers the received EPG data to the control unit 160. The display unit

120 outputs various display data generated in the digital broadcasting reception terminal 100. The display unit 120 can include an (LCD) Liquid Crystal Display which can support high-resolution digital broadcast data.

The multimedia unit 130 demultiplexes digital broadcast frames which have been demodulated and transferred by the digital broadcasting receiver 110 so as to separate the broadcast frames into video and audio frames. The multimedia unit 130 decodes the video and audio frames, and outputs the decoded video and audio frames through the display unit 120 and the audio processor 140, respectively.

The audio processor 140 modulates an electric signal inputted from a microphone into audio data. Also, the audio processor 140 modulates encoded audio data inputted from the RF unit 180 into an electric signal and outputs the electric signal through a speaker. The audio processor 140 may include a codec for converting a digital audio signal received by the RF unit 180 into an analog signal and reproducing the analog signal and for converting an analog audio signal generated from the microphone into a digital audio signal. The codec consists of a data codec for processing packet data and an audio codec for processing an audio signal such as a speech signal. The codec can be provided as an independent element or included in a control unit 110.

The key input unit 150 transfers a signal corresponding to a key input or a voice input by the user to the control unit 160

The control unit 160 controls overall operations of the digital broadcasting reception terminal 100. According to the present invention, the control unit 160 sets a broadcast picture display function upon a request by the user for displaying a picture extracted from a broadcast program as a wallpaper or a background image for the digital broadcasting reception terminal. The broadcast picture display function includes a broadcast picture display for each channel, a broadcast picture display for a specific channel and a broadcast picture display according to a specific search keyword. In other words, the control unit 160 allows the user to set one of the three broadcast picture display types to implement the broadcast picture display function.

Once the broadcast picture display function is set, the control unit 160 periodically changes the operation mode of the digital broadcasting reception terminal 100 from a standby mode to a digital broadcasting reception mode at preset time intervals (for example, every 30 minutes) and captures a picture from a digital broadcast program currently delivered over a specific channel. At this time, the control unit 160 should preferably not output the digital broadcast program. The time interval can be previously set as a default value or selected by the user.

After capturing a picture from the digital broadcast program, the control unit 160 terminates the digital broadcasting reception mode and changes the mode to the standby mode.

In the standby mode, the control unit 160 displays the captured picture as a wallpaper on the display unit 120. At this time, the control unit 160 can also display information relating to the captured picture in a specific location on the displayed wallpaper. The information may include a channel number, channel name, broadcast program name and broadcast program information. The control unit 160 obtains the information relating to the captured picture from Event Information Table (EIT) among various table information composing digital broadcast guide data, such as Network Information Table (NIT), Broadcaster Information Table (BIT), Service Description Table (SDT) and Event Information Table (EIT). The control unit 160 continues the process of periodically capturing a picture from the current digital broadcast program and displaying the captured picture on the display unit 120 until the user inputs a request for terminating the broadcast picture display function.

Now, the controlling function of the control unit 160 to capture a picture from a broadcast program will be briefly explained. The control unit 160 controls the multimedia unit 130 to separate a digital broadcast frame into video and audio frames as well as to decode the video and audio frames. The control unit 160 extracts YUV data from the decoded video frame through the multimedia unit 130 and stores the extracted YUV data in the memory 170 to capture a picture from a broadcast program. The YUV data is displayed on the display unit 120 through a frame buffer (not shown) of the display unit 120 during the display of a wallpaper. Since the YUV data is generally known in the art, no further explanation will be made.

In addition, the control unit 160 controls the multimedia unit 130 to extract I frame included in the video frame. The extracted I frame is converted into a Joint Photographic Experts Group (JPEG) format and stored in the memory 170 to capture a picture from a broadcast program. The conversion of the extracted I frame into a JPEG format can be achieved by adding a JPEG header to the I frame.

The memory 170 stores various information necessary to control the operations of the digital broadcasting reception terminal 100. According to the present invention, the memory 170 receives digital broadcast program guide data having information on digital broadcast programs through the digital broadcasting receiver 110 and stores the received data under the control of the control unit 160. The digital broadcast program guide data is updated at periodic time intervals under the control of the control unit 160.

The RF unit 180 transmits and receives audio, text, video and control data under the control of the control unit 160. The RF unit 180 includes an RF transmitter (not shown) for performing upward conversion and amplification of the frequency of a transmitted signal and an RF receiver (not shown) for amplifying a received signal with low noise and performing downward conversion of the frequency of the signal. Although not shown in FIG. 1, the RF unit 180 may include a modem having a transmitter for coding and modulating a signal which will be transmitted and a receiver for demodulating and decoding a received signal.

Figure 2:
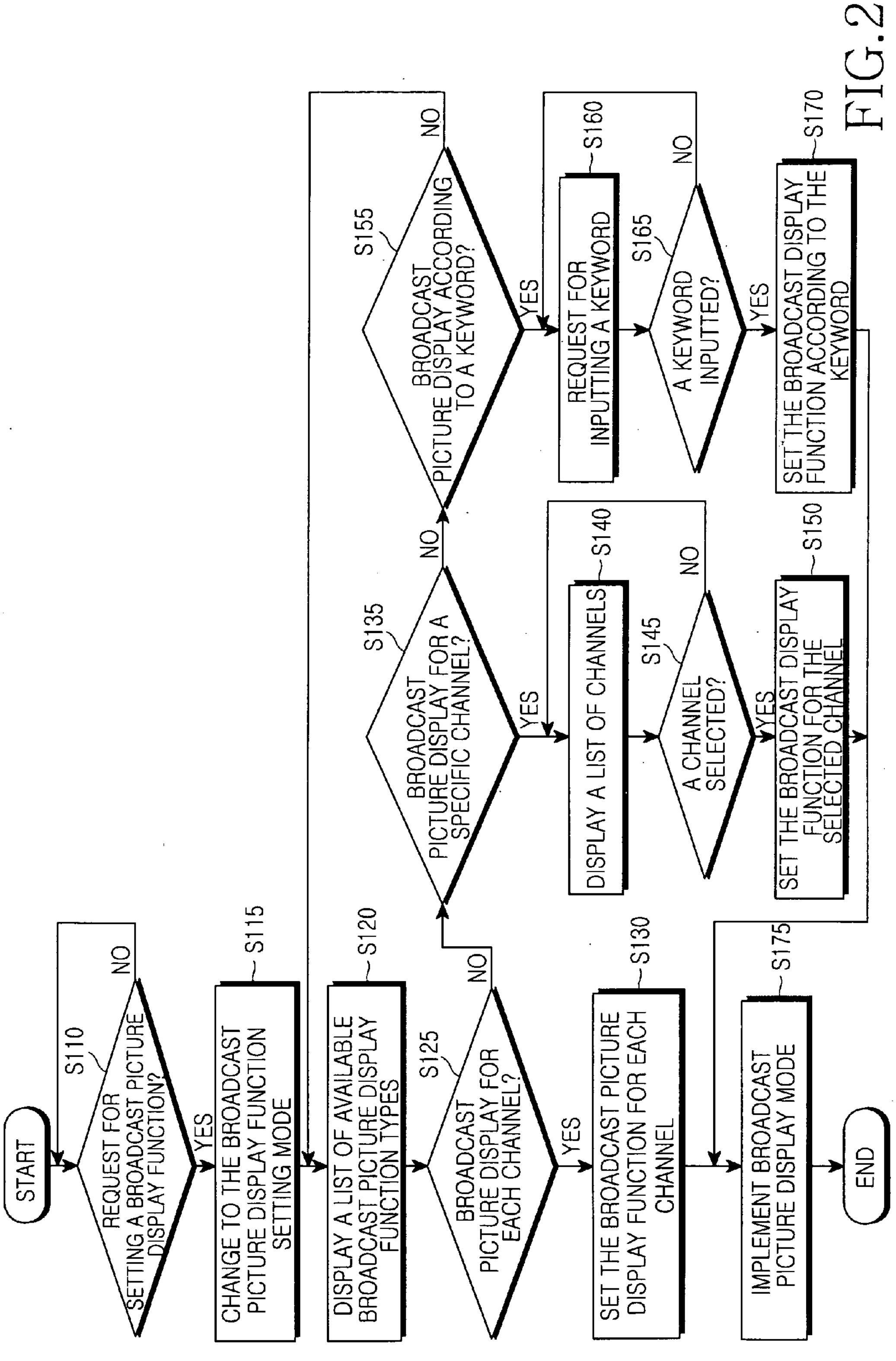
FIG. 2 is a flow chart showing a process for setting a broadcast picture alert function in a digital broadcasting reception terminal according to the present invention.

FIG. 2 is a flow chart showing a process for setting a broadcast picture display function in a digital broadcasting reception terminal according to the present invention.

Referring to FIGS. 1 and 2, the control unit 160 determines whether the user inputs a request for setting a broadcast picture display function (S110). The user can input the request using a menu key. Alternatively, if a separate short-cut key for inputting the request is provided on the key input unit 150, the user can input the request using the short-cut key. Upon detecting a request for setting the broadcast picture display function, the control unit 160 changes the current operation mode of the digital broadcasting reception terminal 100 to a broadcast picture display mode (S115).

In the broadcast picture display mode, the control unit 160 displays a list of available broadcast picture display function types on the display unit 120 (S120). The broadcast picture display types include a broadcast picture display for each channel, a broadcast picture display for a specific channel and a broadcast picture display according to a specific search keyword. The control unit 160 determines whether the user selects the broadcast picture display for each channel from the displayed list (S125). When the user selects the broadcast picture display for each channel and presses an OK key, the control unit 160 sets the selected broadcast picture display type (S130).

If the broadcast picture display for each channel is not selected in step 125, the control unit 160 will then determine whether the user has selected the broadcast picture display for a specific channel (S135).

When the user selects the broadcast picture display for a specific channel, the control unit 160 searches the digital broadcast program guide data stored in the memory 170 to detect channels over which broadcasts can be received and then displays a list of detected channels on the display unit 120 (S140). Subsequently, the control unit 160 determining whether the user selects a channel from the displayed list (S145).

Upon the user's selection of a channel, the control unit 160 set the broadcast picture display function for the selected channel (S150). If the broadcast picture display for a specific channel is not selected in step 135, the control unit 160 will then determine whether the user has selected the broadcast picture display according to a search keyword (S155). When the user selects the broadcast picture display according to a search keyword, the control unit 160 requests the user to input a search keyword (S160). At this time, the control unit 160 can preferably generate a window for inputting the keyword and display the generated window on the display unit 120.

Then the control unit 160 determining whether the user has inputted a specific search keyword (S165).

When the user inputs a keyword (for example, an actor's or actress' name), the control unit 160 set the broadcast display function to be implemented based on the inputted keyword (S170). After setting the broadcast display function, the control unit 160 activates the broadcast picture display mode (S175).

Although not explained with reference to FIG. 2, the process for setting the broadcast picture display function may further include a step of allowing the user to set time intervals at which the broadcast picture display function is periodically implemented in the digital broadcasting reception terminal 100.

FIGS. 3A through 3D are views for explaining the process for setting the broadcast picture display function in the digital broadcasting reception terminal 100 according to the present invention.

Figure 3A:
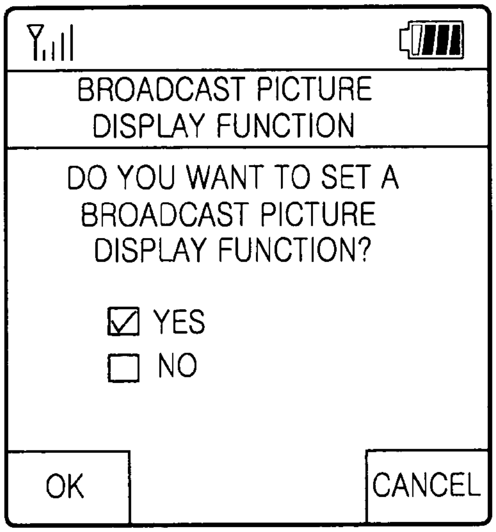
FIGS. 3A through 3D are views for explaining a broadcast picture display function in a digital broadcasting reception terminal according to the present invention.

FIG. 3A illustrates the display of a message asking, "Do you want to set a broadcast picture display function?" under a menu for setting the broadcast picture display function. Preferably, the menu for setting the broadcast picture display function should be a sub-menu registered in a menu key.

Figure 3B:
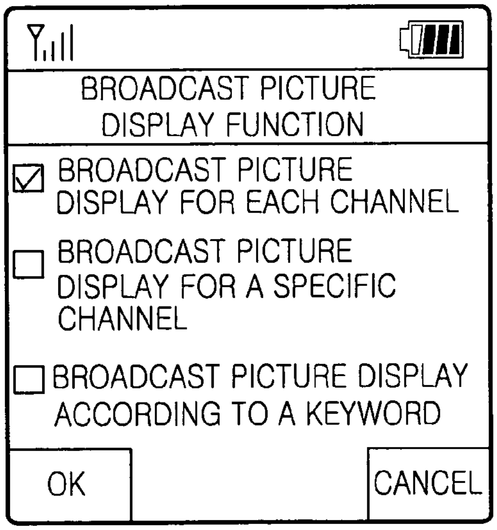

When the user selects "Yes" to set the broadcast picture display function as illustrated in FIG. 3A and presses the OK key, the digital broadcasting reception terminal 100 displays a list of broadcast picture display types as illustrated in FIG. 3B.

FIG. 3B illustrates the display of a list of broadcast picture display types (broadcast picture display for each channel, broadcast picture display for a specific channel and broadcast picture display according to a search keyword). FIG. 3B shows that the broadcast picture display for each channel is selected from the list. When the user presses the OK key after selecting the "broadcast picture display for each channel" as illustrated in FIG. 3B, the digital broadcasting reception terminal then sets the broadcast picture display for each channel and implements the broadcast picture display mode.

Figure 3C:
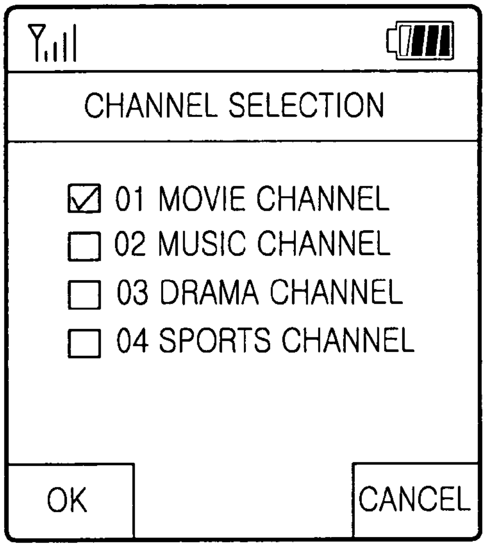

If the user selects the "Broadcast picture display for a specific channel" from the list of broadcast picture display types (broadcast picture display for each channel, broadcast picture display for a specific channel and broadcast picture display according to a search keyword) in FIG. 3B and presses the OK key, the digital broadcasting reception terminal will then display a list of channels as illustrated in FIG. 3C.

When the user selects one of the listed channels (for example, "01 Movie Channel") and presses the OK key, the digital broadcasting reception terminal sets the broadcast picture display for the selected channel and implements the broadcast picture display mode.

Figure 3D:
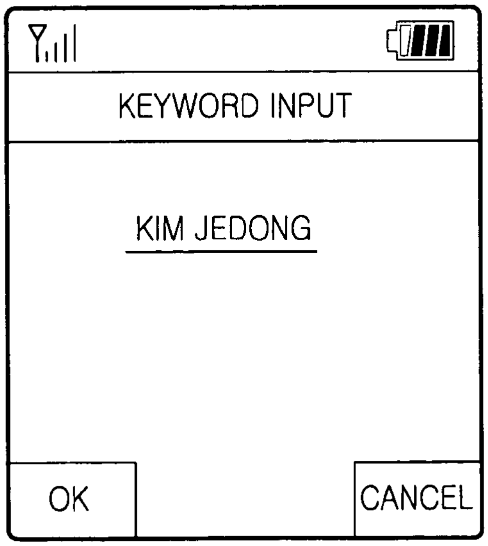

If the user selects the "broadcast picture display according to a search keyword" from the list of broadcast picture display types (broadcast picture display for each channel, broadcast picture display for a specific channel and broadcast picture display according to a search keyword) in FIG. 3B and presses the OK key, the digital broadcasting reception terminal will then display a screen for inputting a search keyword as illustrated in FIG. 3D. The keyword can be a person's (e.g. an entertainer's) name or a broadcast program name.

When the user inputs an entertainer's name "Kim Jedong" in the screen of FIG. 3D, the digital broadcasting reception terminal sets the broadcast picture display function according to the inputted name and implements the broadcast picture display mode to display a picture of any broadcast program relating to the inputted name.

Figure 4:
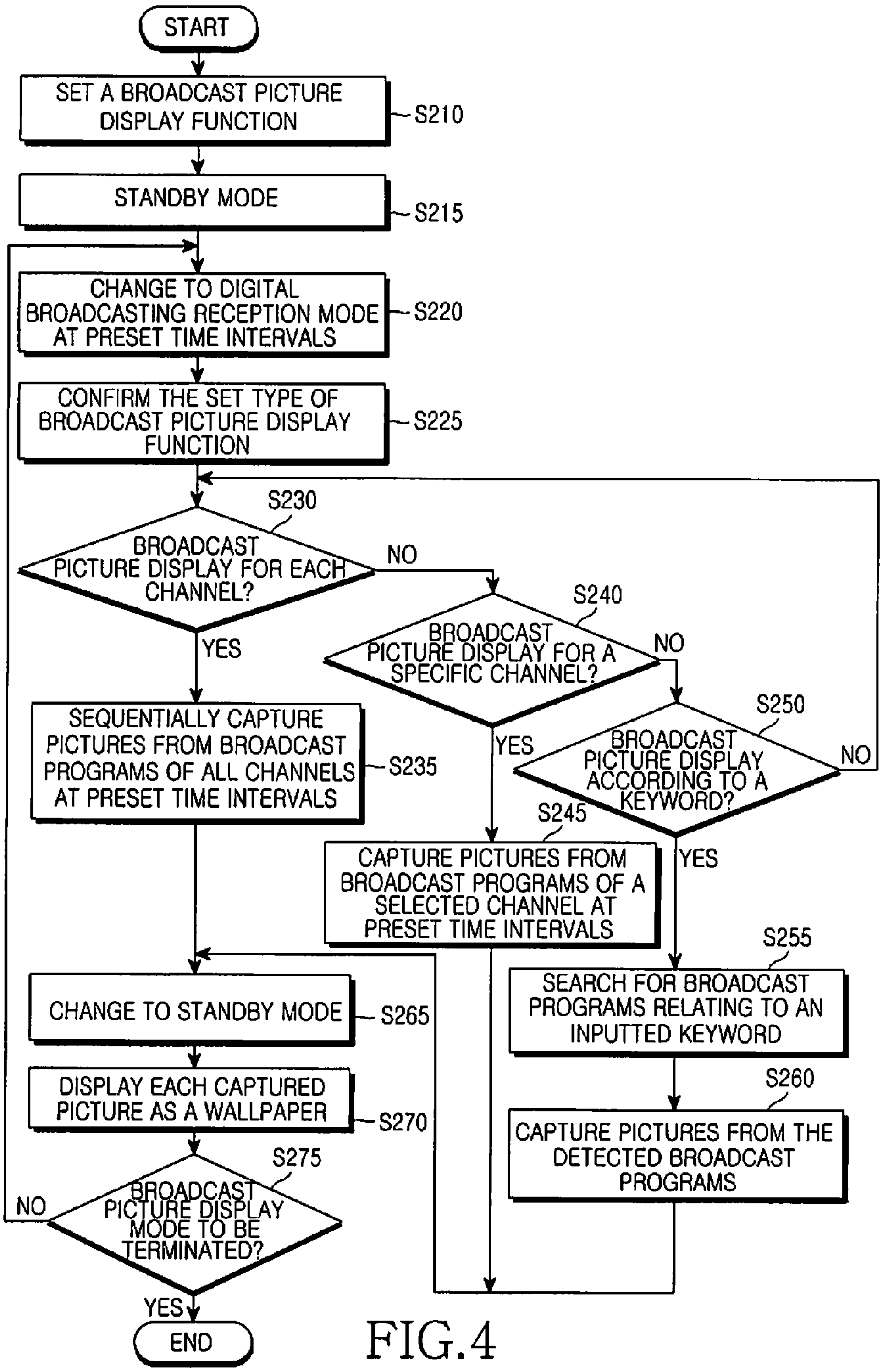
FIG. 4 is a flow chart showing the operations of a digital broadcasting reception terminal according to the present invention.

FIG. 4 is a flow chart showing the operations of a digital broadcasting reception terminal according to the present invention.

Referring to FIGS. 1 and 4, the control unit 160 sets a broadcast picture display function in response to the user's request (S210). Specifically, in step S210, the control unit 160 sets one of different broadcast picture display types (broadcast picture display for each channel, broadcast picture display for a specific channel and broadcast picture display according to a search keyword) as selected by the user. Since the process of setting the broadcast picture display function has been explained in detail with reference to FIGS. 2 and 3, any further explanation of the process will be omitted. In step 210, the control unit 160 can also set time intervals (for example, 30 minutes) at which the broadcast picture display function is periodically implemented. The time intervals can be set as a default value or selected by the user.

In the standby mode (S215), the control unit 160 periodically changes the current operation mode of the digital broadcasting reception terminal 100 to the digital broadcasting reception mode at preset time intervals (S220).

When the operation mode of the digital broadcasting reception terminal 100 is changed to the digital broadcasting reception mode, the control unit 160 confirms the broadcast picture display function set in step 210 (S225). In other words, the control unit 160 confirms which type of broadcast picture display has been set.

The control unit 160 determines whether the broadcast picture display for each channel has been set (S230). If the broadcast picture display for each channel has been set, the control unit 160 will control the multimedia unit 130 to sequentially capture pictures from all different channels at preset time intervals (S235). Assuming that there are three broadcast channels (channel numbers 1 to 3), the control unit 160 controls the multimedia unit 130 to capture a picture from a program broadcast over channel number 1 at a first time interval, a picture from a program broadcast over channel number 2 at a second time interval, and a picture from a program broadcast over channel number 3 at a third time interval. If it is determined that the broadcast picture display for each channel has not been set (S230), the control unit 160 will then confirm whether the broadcast picture display for a specific channel has been set (S240).

If the broadcast picture display for a specific channel has been set, the control unit 160 will control the multimedia unit 130 to capture a picture from a program broadcast over a channel selected by the user (S245). If it is determined that the broadcast picture display for a specific channel has not been set (S240), the control unit 160 will then confirm whether the broadcast picture display according to a search keyword has been set (S250).

If the broadcast picture display according to a search keyword has been set, the control unit 160 will control the multimedia unit 130 to search for any digital broadcast program relating to an inputted keyword in the digital broadcast program guide data stored in the memory 170 (S255). To extract the digital broadcast program relating to the inputted keyword, the control unit 160 uses various table information composing the digital broadcast guide data, such as Network Information Table (NIT), Broadcaster Information Table (BIT), Service Description Table (SDT) and Event Information Table (EIT). NIT includes information on satellites and network names. BIT is used to transmit information on TV stations, which includes notices from TV stations, TV station names and a list of current TV channels. SDT is used to transmit information on each channel which includes channel names, Uniform Source Locator (URL) of each channel and channel types. EIT shows information on each broadcast program which includes program names, program URL information, program broadcast times and brief explanations of programs. The control unit 160 may search for a broadcast program relating to the inputted search keyword using SDT and EIT information of the digital broadcast program guide data. Before searching for a digital broadcast program relating to the keyword, the control unit 160 may check whether the digital broadcast program guide data is updated. If the digital broadcast program guide data is not updated, the control unit 160 should preferably update the digital broadcast program guide data.

When a broadcast program relating to the keyword is detected from the updated digital broadcast program guide data, the control unit 160 captures a picture from the detected broadcast program (S260).

Then the control unit 160 terminates the digital broadcasting reception mode and changes the operation mode of the digital broadcasting reception terminal 100 to the standby mode (S265).

The control unit 160 displays the picture from the broadcast program as a wallpaper on the display unit 120 (S270). At this time, the control unit 160 can also display information about the captured picture in a specific location on the displayed wallpaper. The information can include a channel number, channel name, broadcast program name and broadcast program information.

While displaying the wallpaper, the control unit 160 determines whether the user inputs a request for terminating the broadcast picture display mode (S275). If the request is not inputted, the control unit 160 will repeat step 220 in order to implement the broadcast picture display function that captures a picture from another broadcast program and displays the captured picture on the display unit 120.

The digital broadcasting reception terminal 100 as explained above includes the multimedia unit 130 as a separate component. However, it is also possible to incorporate the multimedia unit 130 into the control unit 160.

The digital broadcasting reception terminal 100 according to the present invention provides a broadcast picture display function for periodically capturing a picture from a digital broadcast program currently delivered and displaying the captured picture as a wallpaper even when the user does not view the digital broadcast program. Accordingly, the user can easily obtain information on the current digital broadcast program.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A wallpaper display method comprising:

selecting a type of broadcast picture display and setting a broadcast picture display function to display a specific broadcast picture as a wallpaper in response to a user request;

changing an operation mode from a standby mode to a reception mode when the broadcast picture display function is set;

capturing a picture from a digital broadcast currently being delivered on a determined channel according to the selected type of broadcast picture display in the reception mode, without outputting a digital broadcast program;

terminating the reception mode after capturing the picture and changing the operation mode to the standby mode; and displaying, on a display unit of a terminal, the captured picture as a wallpaper for the terminal in the standby mode, wherein capturing the picture from the digital broadcast currently being delivered includes:

identifying which type of broadcast picture display function has been set; and capturing the picture from the digital broadcast currently being delivered on the determined channel according to the set type of broadcast picture display function.

2. The method according to claim 1, wherein the setting of the broadcast picture display function sets one of a broadcast picture display for each channel, a broadcast picture display for a specific channel, and a broadcast picture display according to a search keyword.

3. The method according to claim 1, wherein the picture is captured at a preset time interval set by the user.

4. The method according to claim 1, wherein the step of capturing the picture from the digital broadcast currently being delivered further includes:

sequentially capturing pictures from digital broadcasts of different channels at preset time intervals, if it is identified that the broadcast picture display is set for each channel.

5. The method according to claim 4, wherein the step of capturing the picture from the digital broadcast currently being delivered includes:

capturing pictures, at the preset time intervals, from digital broadcasts of a channel selected by the user, if it is identified that the broadcast picture display is set for the specific channel.

6. The method according to claim 5, wherein the step of capturing the picture from the digital broadcast currently being delivered includes:

searching previously stored digital broadcast program guide data to detect broadcast programs relating to the search keyword inputted by the user, if it is identified that the broadcast picture display has been set according to the input search keyword; and capturing pictures from the broadcast programs at preset time intervals.

7. The method according to claim 1, wherein the step of capturing the picture from the digital broadcast currently being delivered includes:

capturing pictures, from digital broadcasts relating to a search keyword input by the user, if it is identified that the broadcast picture display is set according to a search keyword.

8. The method according to claim 1, wherein the step of displaying the captured picture as the wallpaper includes displaying information about the captured picture at a specific location on the displayed wallpaper.

9. The method according to claim 8, wherein the displayed information includes one of a channel number, channel name, broadcast program name, and broadcast program information.

10. The method according to claim 1, wherein the steps of selecting the type of broadcast picture display, changing the operation mode, capturing a picture from the digital broadcast currently being delivered on the determined channel, terminating the reception mode, and displaying the captured picture as the wallpaper are periodically repeated at a preset time interval.

11. A terminal comprising:

a display unit; and a control unit configured to:

select a type of broadcast picture display and set a broadcast picture display function to display a specific broadcast picture as a wallpaper in response to a user request, change an operation mode from a standby mode to a reception mode when the broadcast picture display function is set, capture a picture from a digital broadcast currently being delivered on a determined channel according to the selected type of broadcast picture display in the reception mode, without outputting a digital broadcast program, terminate the reception mode after capturing the picture and change the operation mode to the standby mode, control the displaying, on the display unit, the captured picture as a wallpaper for the terminal in the standby mode, identify which type of broadcast picture display function has been set, and capture the picture from the digital broadcast currently being delivered on the determined channel according to the set type of broadcast picture display function, wherein the display of the captured picture as the wallpaper includes displaying information about the captured picture at a specific location on the displayed wallpaper.

12. The terminal of claim 11, wherein setting the broadcast picture display function sets one of a broadcast picture display for each channel, a broadcast picture display for a specific channel, and a broadcast picture display according to a search keyword.

13. The terminal of claim 11, wherein the control unit is further configured to sequentially capture a plurality of pictures from digital broadcasts of a plurality of different channels at respective preset time intervals, when the broadcast picture display is set for each channel, and to capture the plurality of pictures, at the respective preset time intervals, from digital broadcasts of a channel selected by the user, when the broadcast picture display is set for a specific channel.

14. The terminal of claim 11, wherein the displayed information includes one of a channel number, channel name, broadcast program name, and broadcast program information.

15. The terminal of claim 11, wherein the control unit is further configured to capture a plurality of pictures from respective digital broadcasts relating to a search keyword input by the user when the broadcast picture display is set according to a search keyword.

16. The terminal of claim 15, wherein the control unit is further configured to search previously stored digital broadcast program guide data to detect broadcast programs relating to the search keyword inputted by the user, when the broadcast picture display has been set according to the input search keyword, and capture pictures from the broadcast programs at the preset time intervals.

* * * * *